Patented May 15, 1923.

1,455,747

UNITED STATES PATENT OFFICE.

ALBERT E. GREENE, OF SEATTLE, WASHINGTON, AND WILLIAM B. RUNYAN, OF DAYTON, OHIO.

ELECTRIC PROCESS OF CONTINUOUSLY HEATING METAL.

No Drawing.     Application filed April 22, 1920. Serial No. 375,785.

*To all whom it may concern:*

Be it known that we, ALBERT E. GREENE, a citizen of the United States, residing at Seattle, in the county of King and State of Washington, and WILLIAM B. RUNYAN, a citizen of the United States, residing at Dayton, in the county of Montgomery and State of Ohio, have invented certain new and useful Improvements in Electric Processes of Continuously Heating Metal, of which the following is a specification.

This invention relates to a process of superheating molten metal like iron by passing it continuously through an electrically heated furnace chamber, and this invention relates more particularly to passing the molten metal continuously through the channel of an induction furnace while causing current to be induced in the metal and heating it.

An electric induction furnace is especially adapted to the rapid and efficient heating of metal by the induction of current therein while the metal forms the secondary of a transformer circuit. An induction furnace is adapted to heating a stream of molten metal flowing through the induction furnace channel by reason of the fact that the channel may be relatively small and a large amount of heat energy can readily be developed in the metal while in the channel, and it is practically impossible for a metal stream entering one part of the channel to circulate around to another part without being more or less uniformly heated. This effect is considerably more efficient in an induction furnace than in the case of passing a stream of metal through an electrically heated bath held in a hearth type furnace heated by an arc furnace because in the arc heated furnace the metal stream may not pick up heat uniformly as it passes through; nor is it possible to heat the metal so efficiently by conduction and radiation as to simply generate the heat within the metal proper. Other advantages of using an induction furnace for such a process of superheating, rather than an arc furnace, are the following:—thoro mixing is accomplished in the induction furnace due to the electrical effect; this effect is lacking in an arc furnace of the hearth type where the stream of cold metal entering one side of the bath would naturally tend to assume the position next to the bottom of the hearth owing to the higher specific gravity of the cooler metal stream and it would not therefore take up the heat from the arcs nearly so efficiently. However, this invention is not limited to heating the metal while passing through an induction furnace but contemplates also the process of continuously heating a stream of metal by adding heat to it electrically while passing through a suitable chamber, for instance, by heating the metal electrically by means of arcs. An induction furnace is advantageously used for such heating by causing the entering cold stream of metal to enter into the top of the channel at one side of the channel, thus maintaining a certain constant level of metal in the channel; this cold metal tends to go to the bottom of the channel; then the effect of the current on the metal in the channel is to cause eddy currents in it and stir it up well as the metal passes around to another point at which an outlet is provided through a suitable spout or tap hole; and here again the outgoing metal is taken from the top of the bath level or strata which is the hottest part of the bath. The tap hole is of course left open continuously.

Another advantage of this process is that the metal may be heated in a small furnace of high power capacity and a further advantage is that the continuous passing of the metal through the channels keeps the temperature of the refractory lining comparatively low and thus tends to long life of furnace lining. Of course this process is accomplished in an induction furnace without the use of electrodes which is a saving. The power generated in the molten stream of metal may be controlled in any well known manner such for example as by control of the voltage induced in the molten metal secondary circuit.

This process is especially adapted to the treatment of iron and steel. We have found that iron from a cupola may be very materially improved by superheating and in fact an increase in the strength and valuable properties of iron is possible simply by superheating to a degree heretofore impracticable or impossible in any other kind of furnace. It is likewise adapted to superheating the metal from a heating furnace where the cost of superheating is very much lessened by the use of electric heating for it is difficult to raise the temperature of a bath of hard iron, for example in an air furnace, to a suitable temperature without great delay and wear and cost, yet by merely using the air furnace or combustion furnace for the preliminary heating and the electric furnace for the superheating by passing the metal continuously through the electric furnace a very great advantage is had.

This process does not contemplate heating of a charge of metal in an induction furnace and then tapping the induction furnace because such a process is disclosed in U. S. patents to A. E. Greene Nos. 1031257 and 1036996 which we are aware of.

We are aware that effort has been made to increase the efficiency of melting or heating metal in electric arc furnaces by the use of high energy input so as to melt or heat the metal to the desired temperature in a minimum time. This procedure saves the radiation of heat energy that would otherwise be lost if slower heating were resorted to. As far as we know it has never been proposed heretofore however to utilize the continuous heating process herein proposed enabling us to reach a maximum efficiency by applying the heat energy at high rate whereby the metal is heated in a minimum time while actually passing through the furnace, and whereby further increase of efficiency is accomplished by generating the heat actually within the metal itself so that the container is not subjected to excessive heat and as fast as the metal is heated it is removed from the place of heat development. The result of this procedure is far reaching and highly efficient.

What we claim is:

1. The method of treating metal said method consisting in passing a stream of metal from a container into the channel of an induction furnace and causing the stream of metal to leave the channel at a different point whereby the stream is heated during transit thru the channel by current induced therein.

2. The process of treating metal in an electric furnace which consists in forming a secondary circuit of molten metal around a magnetic core, inducing current in said secondary circuit by means of said core, and causing the metal to flow continuously into said circuit and out at a different point heating the metal meantime.

In testimony whereof I have signed my name to this specification on this 11th day of March, 1920.

ALBERT E. GREENE.

In testimony whereof I have signed my name to this specification on this 17th day of March, 1920.

WILLIAM B. RUNYAN.